United States Patent
Hasushita et al.

(10) Patent No.: US 6,263,168 B1
(45) Date of Patent: Jul. 17, 2001

(54) EYEPIECE OPTICAL SYSTEM FOR A SINGLE LENS REFLEX CAMERA

(75) Inventors: Sachio Hasushita, Saitama; Hiroyasu Ozaki, Tokyo, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/407,995

(22) Filed: Sep. 29, 1999

(30) Foreign Application Priority Data

Sep. 30, 1998 (JP) .................................................. 10-278541
Jun. 4, 1999 (JP) .................................................. 11-158222

(51) Int. Cl.$^7$ ............................ G03B 13/06; G02B 25/00
(52) U.S. Cl. ........................... 396/382; 396/384; 359/645
(58) Field of Search .................................... 396/382, 384, 396/373; 359/644, 645, 689, 734, 735, 784

(56) References Cited

U.S. PATENT DOCUMENTS

| | | | | |
|---|---|---|---|---|
| 4,664,485 | * | 5/1987 | Momiyama et al. ................. | 359/645 |
| 5,136,427 | | 8/1992 | Sugawara ............................. | 359/646 |
| 5,313,327 | | 5/1994 | Ito et al. .............................. | 359/646 |

FOREIGN PATENT DOCUMENTS 59-148021   8/1984   (JP) .
9-146019    6/1997   (JP) .

* cited by examiner

*Primary Examiner*—W. B. Perkey
(74) *Attorney, Agent, or Firm*—Greenblum & Bernstein, P.L.C.

(57) ABSTRACT

An eyepiece optical system, which is used in a single lens reflex camera having a penta mirror, includes a negative first single lens element, a positive second single lens element, and a negative third single lens element, in this order from the penta mirror; wherein the second single lens element is a diopter adjusting lens element which is adjustable along the optical axis; and the following conditions are satisfied:

$$-2 < f_1/f_e < 0 \quad (1)$$

$$0.2 < f_2/f_e < 0.5 \quad (2)$$

$$-10 < f_3/f_e < -1 \quad (3)$$

wherein $f_1$ designates the focal length of the first single lens elements;

$f_2$ designates the focal length of the second single lens element;

$f_3$ designates the focal length of the third single lens element; and $f_e$ designates the focal length of the entire eyepiece optical system when the diopter is −1.0.

6 Claims, 14 Drawing Sheets

Fig. 1
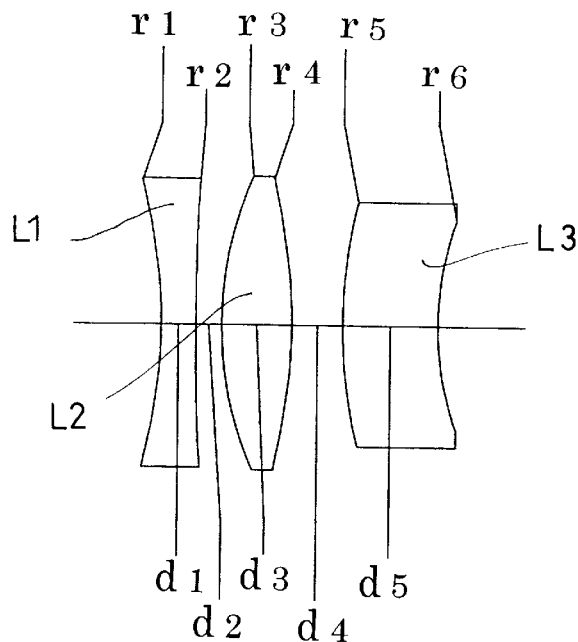
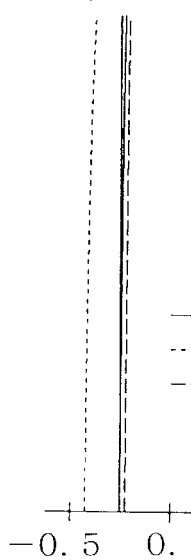
Fig. 2A
φ=10
-0.5  0.5
SPHERICAL
ABERRATION
CHROMATIC
ABERRATION
——— d line
········ g line
- - - C line
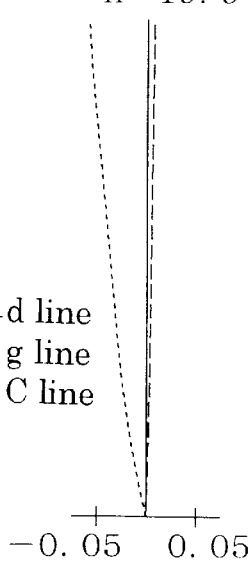
Fig. 2B
h=19.9
-0.05  0.05
LATERAL
CHROMATIC
ABERRATION
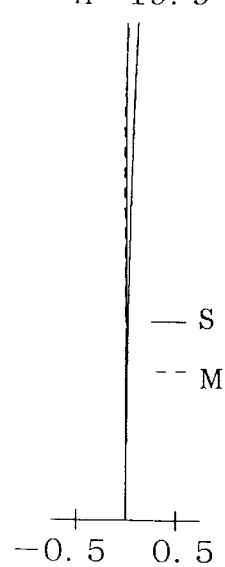
Fig. 2C
h=19.9
— S
-- M
-0.5  0.5
ASTIGMATISM
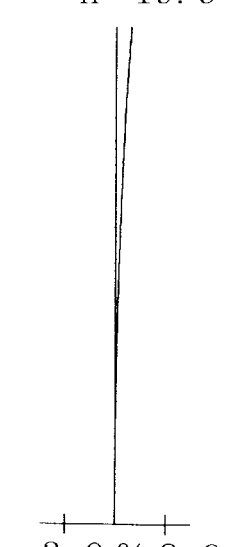
Fig. 2D
h=19.9
-3.0 % 3.0
DISTORTION

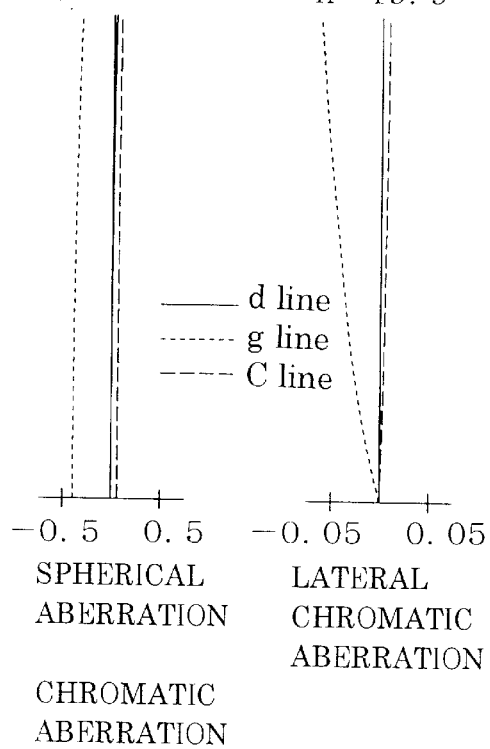
Fig. 3A
φ=10
d line
g line
C line
−0.5  0.5
SPHERICAL
ABERRATION
CHROMATIC
ABERRATION
Fig. 3B
h=19.9
−0.05  0.05
LATERAL
CHROMATIC
ABERRATION
Fig. 3C
h=19.9
— S
-- M
−0.5  0.5
ASTIGMATISM
Fig. 3D
h=19.9
−3.0 % 3.0
DISTORTION
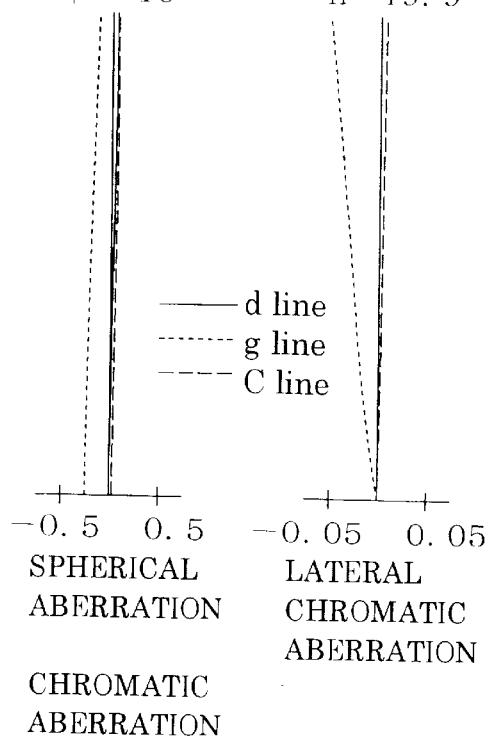
Fig. 4A
φ=10
d line
g line
C line
−0.5  0.5
SPHERICAL
ABERRATION
CHROMATIC
ABERRATION
Fig. 4B
h=19.9
−0.05  0.05
LATERAL
CHROMATIC
ABERRATION
Fig. 4C
h=19.9
— S
-- M
−0.5  0.5
ASTIGMATISM
Fig. 4D
h=19.9
−3.0 % 3.0
DISTORTION

φ=10

——— d line
········ g line
- - - - C line

-0.5  0.5
SPHERICAL
ABERRATION

CHROMATIC
ABERRATION h=19.9

-0.05  0.05
LATERAL
CHROMATIC
ABERRATION h=19.9

——— S
- - M

-0.5  0.5
ASTIGMATISM h=19.9

-3.0 %  3.0
DISTORTION

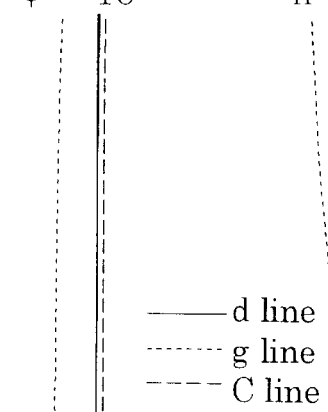
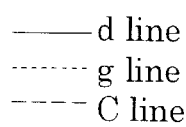
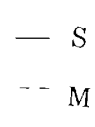
Fig. 7A — φ=10 — SPHERICAL ABERRATION CHROMATIC ABERRATION (d line, g line, C line) −0.5 0.5
Fig. 7B — h=19.9 — LATERAL CHROMATIC ABERRATION −0.05 0.05
Fig. 7C — h=19.9 — ASTIGMATISM (S, M) −0.5 0.5
Fig. 7D — h=19.9 — DISTORTION −3.0 % 3.0
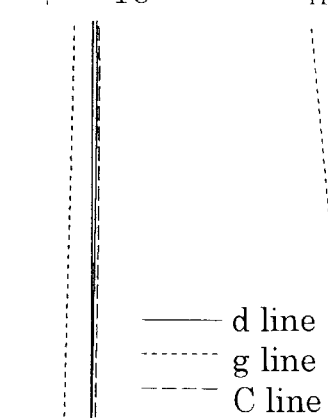
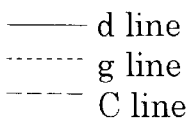
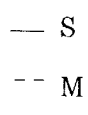
Fig. 8A — φ=10 — SPHERICAL ABERRATION CHROMATIC ABERRATION (d line, g line, C line) −0.5 0.5
Fig. 8B — h=19.9 — LATERAL CHROMATIC ABERRATION −0.05 0.05
Fig. 8C — h=19.9 — ASTIGMATISM (S, M) −0.5 0.5
Fig. 8D — h=19.9 — DISTORTION −3.0 % 3.0

Fig. 9
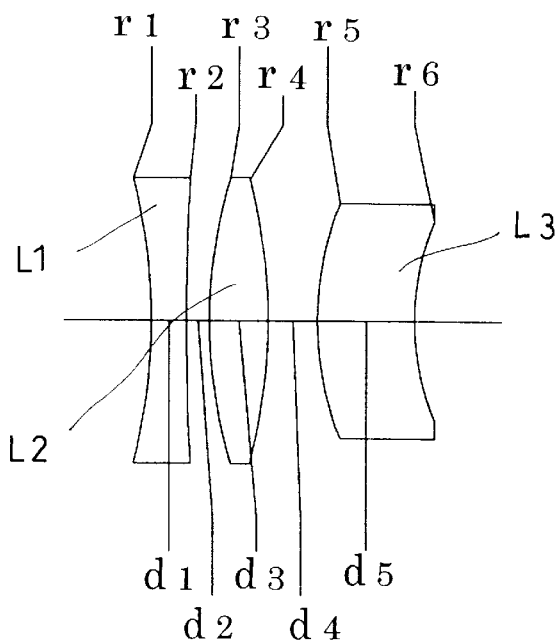
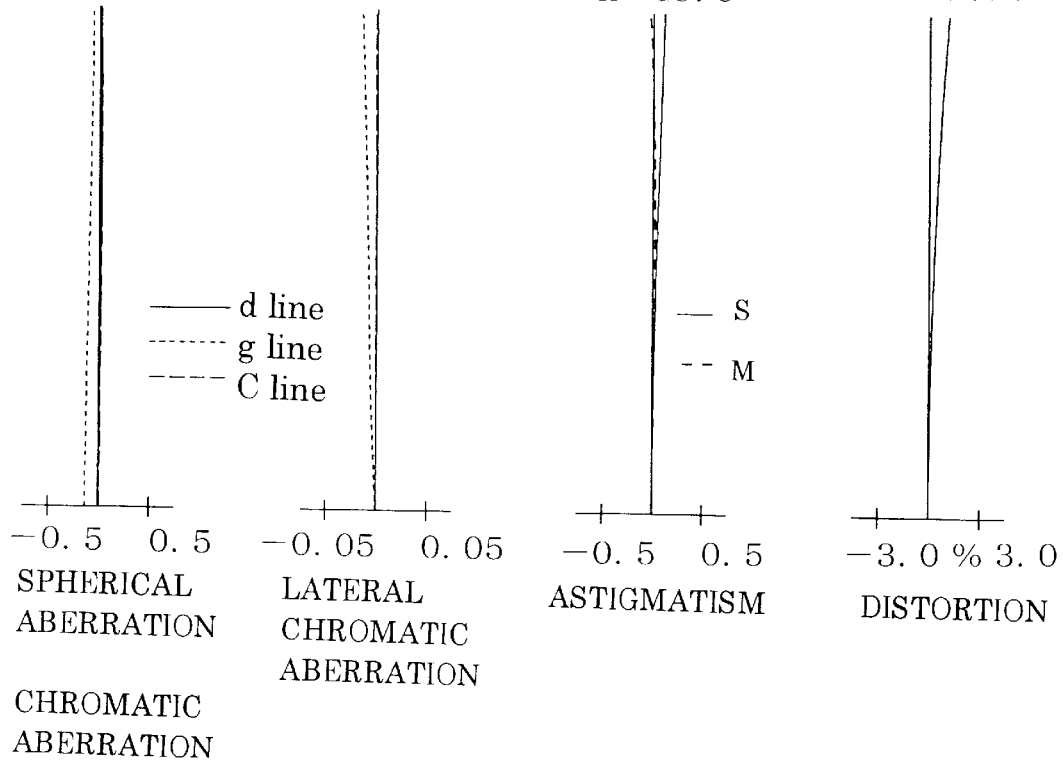
Fig. 10A  Fig. 10B  Fig. 10C  Fig. 10D
φ =10    h=19.9   h=19.9   h=19.9
—— d line
---- g line
---- C line
— S
-- M
-0.5  0.5      -0.05  0.05    -0.5  0.5      -3.0 %  3.0
SPHERICAL      LATERAL        ASTIGMATISM    DISTORTION
ABERRATION     CHROMATIC
               ABERRATION
CHROMATIC
ABERRATION

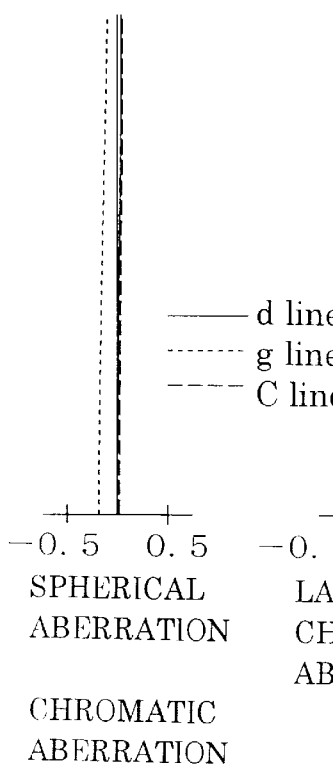

Fig. 13
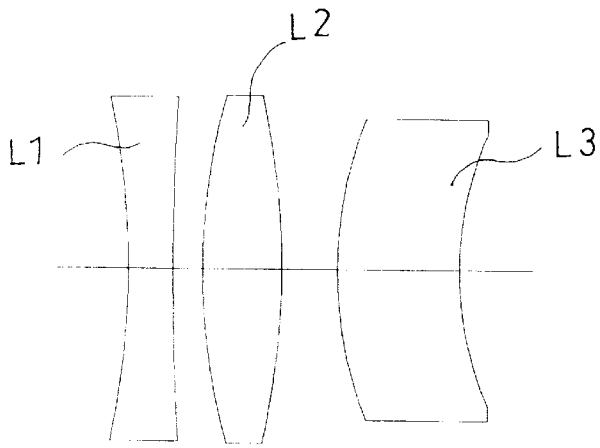
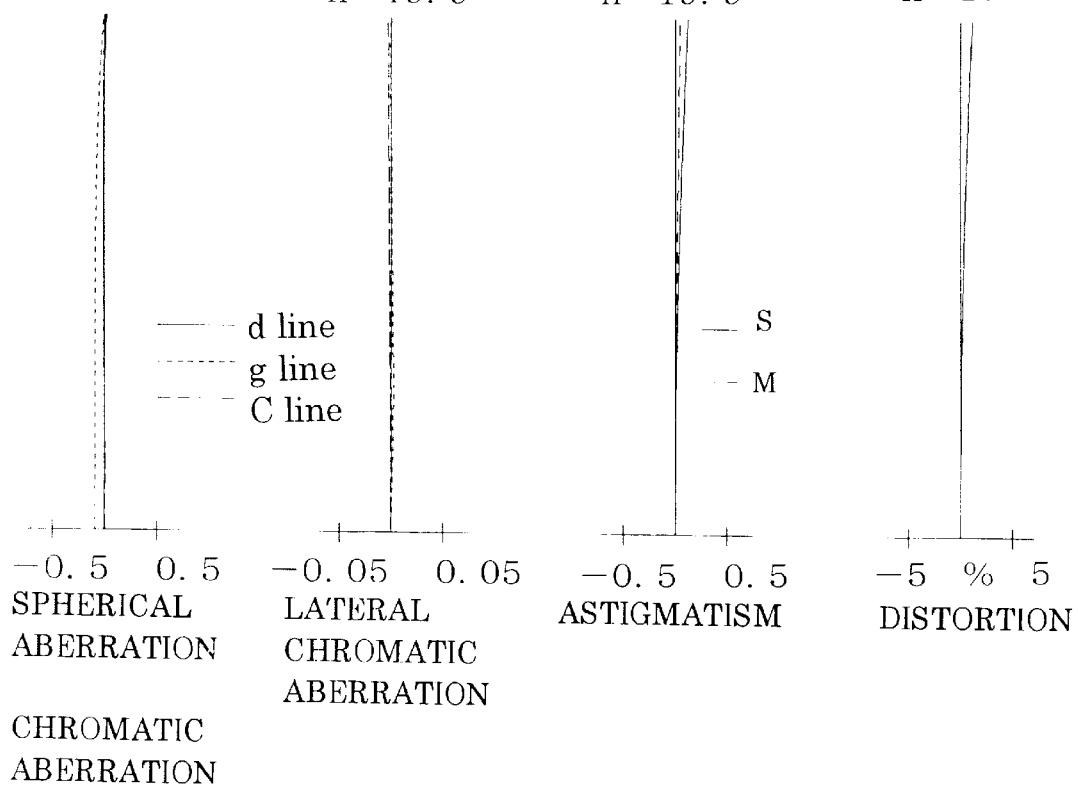
Fig. 14A  Fig. 14B  Fig. 14C  Fig. 14D

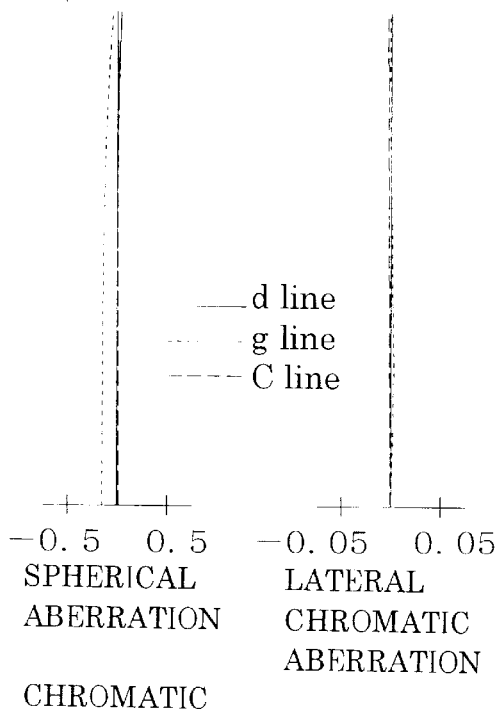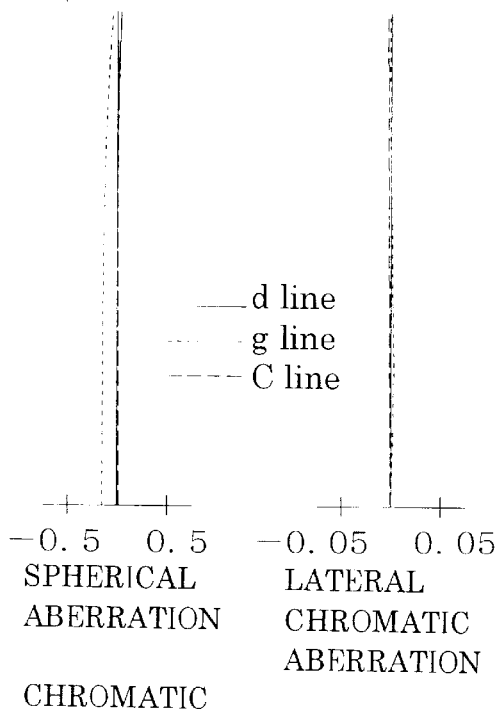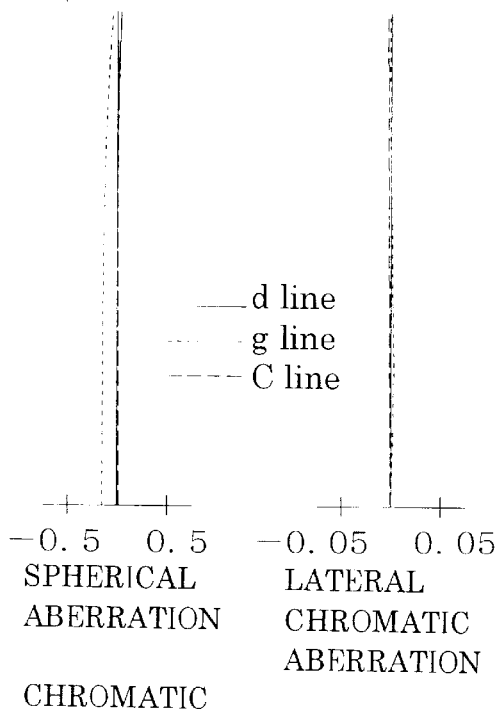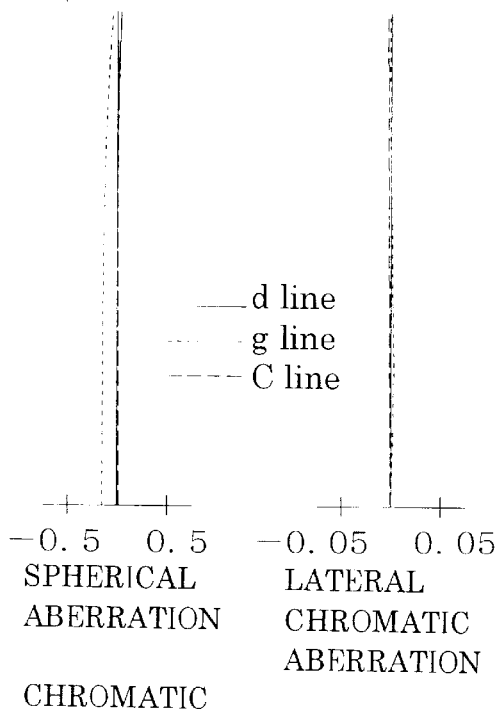
Fig. 15A  Fig. 15B  Fig. 15C  Fig. 15D
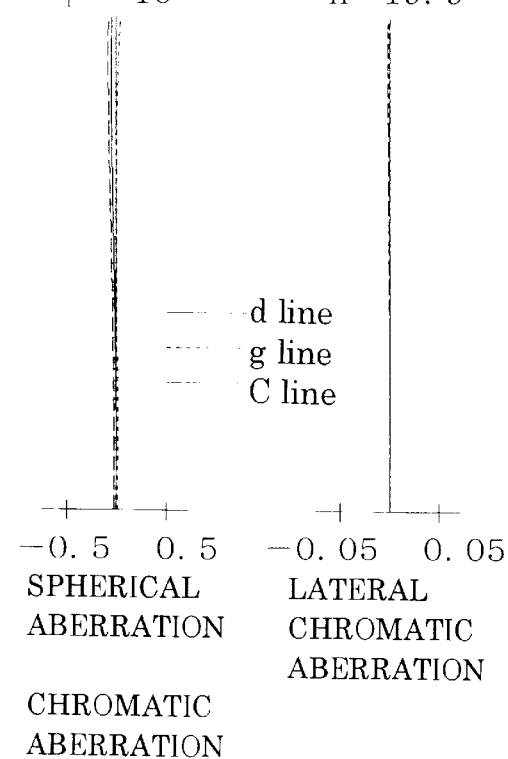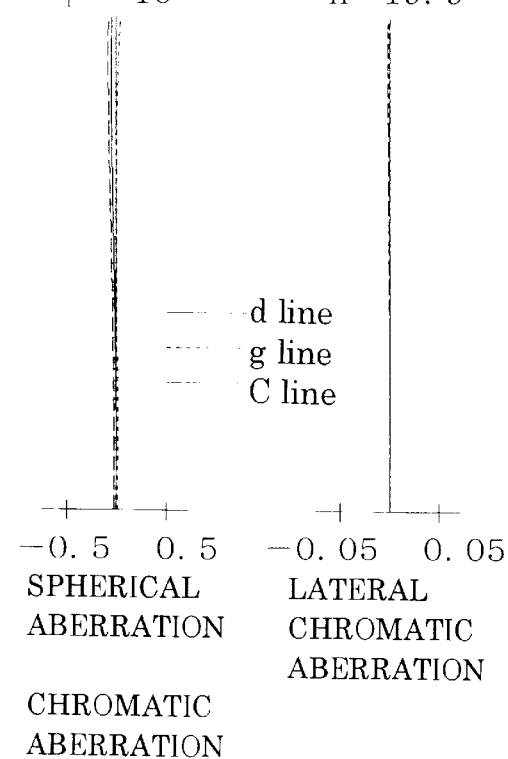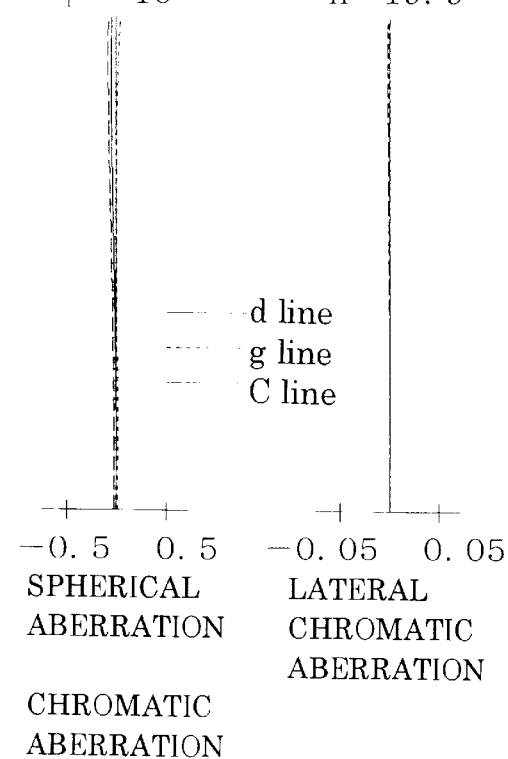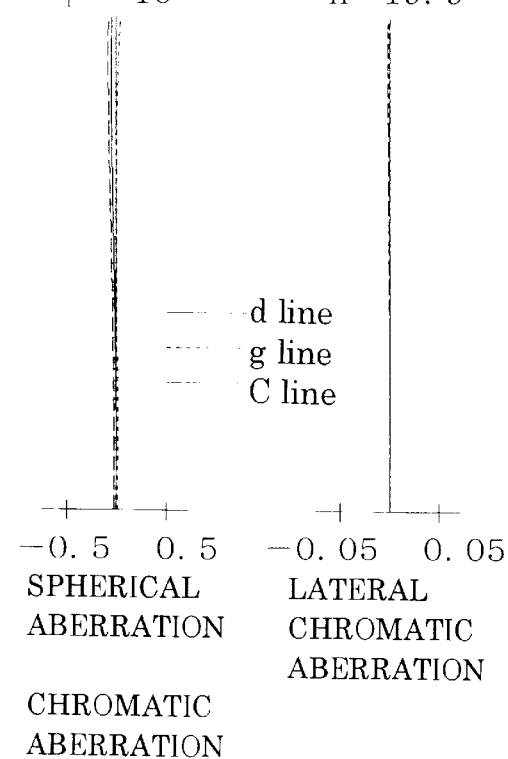
Fig. 16A  Fig. 16B  Fig. 16C  Fig. 16D Fig. 17
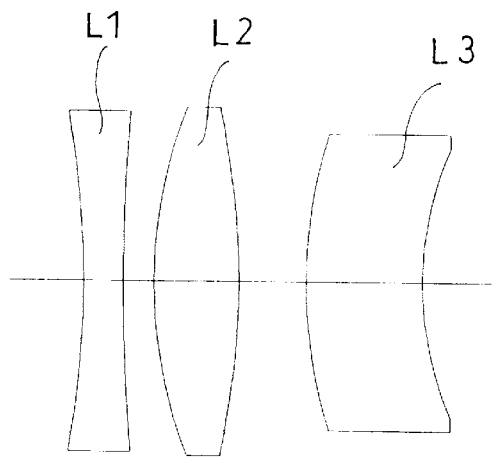
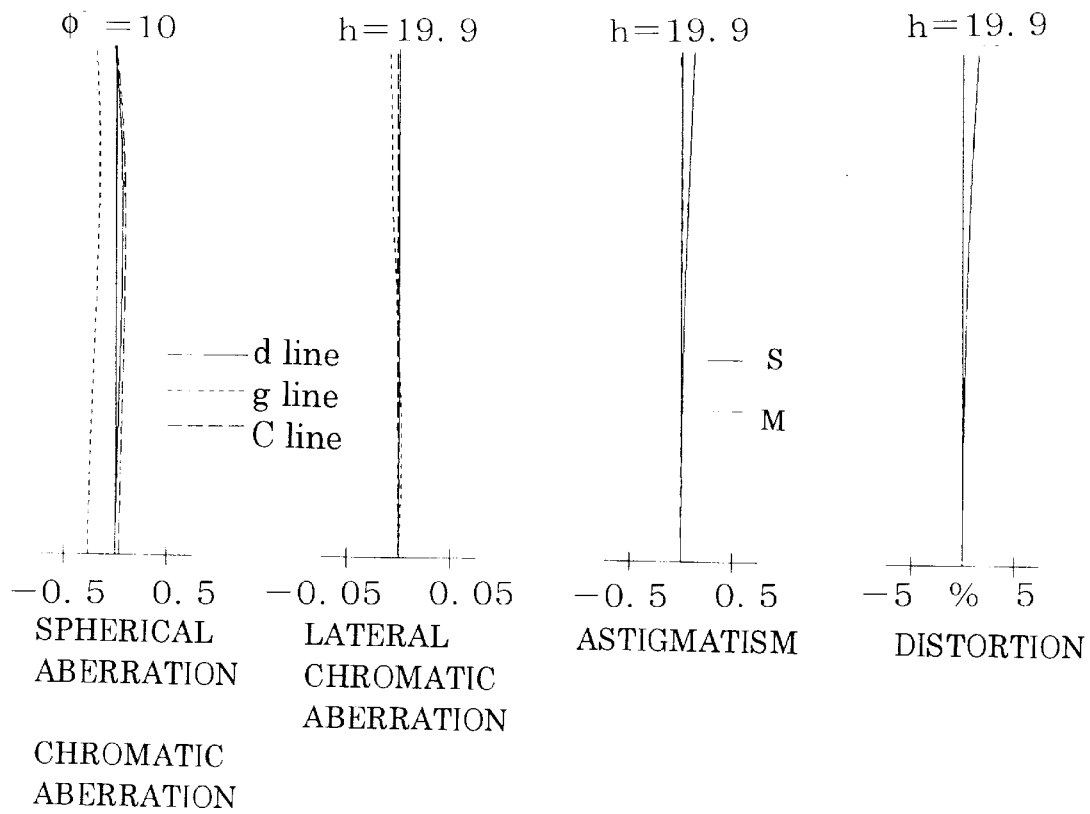
Fig. 18A  Fig. 18B  Fig. 18C  Fig. 18D

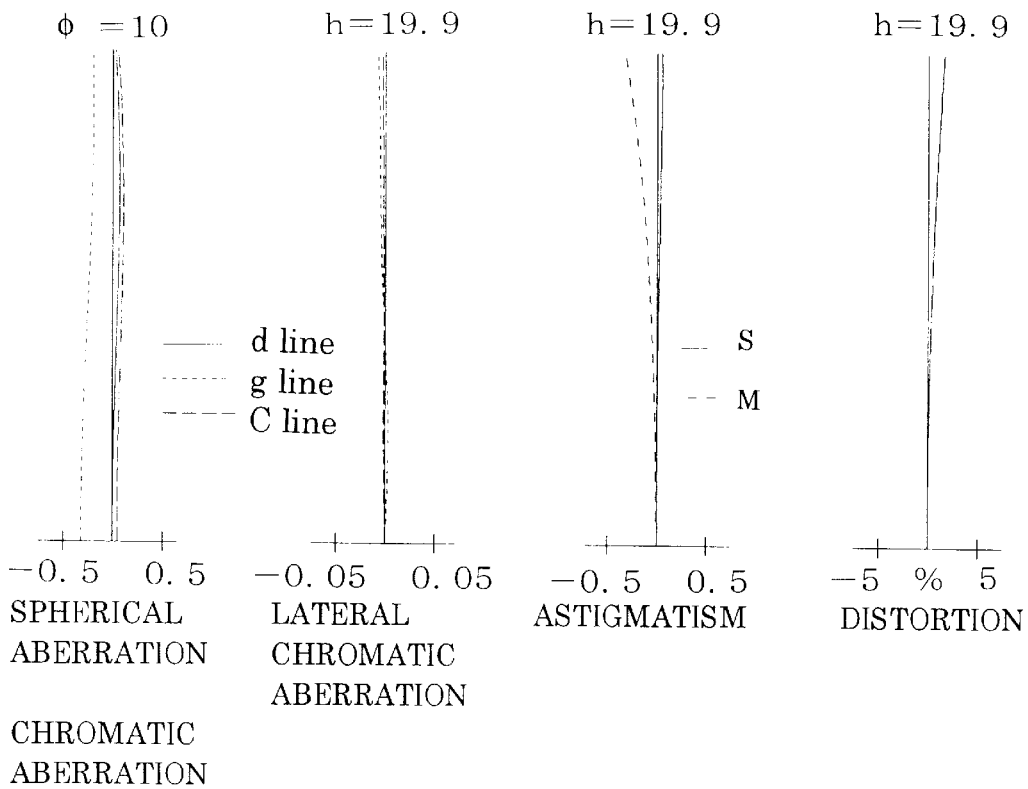
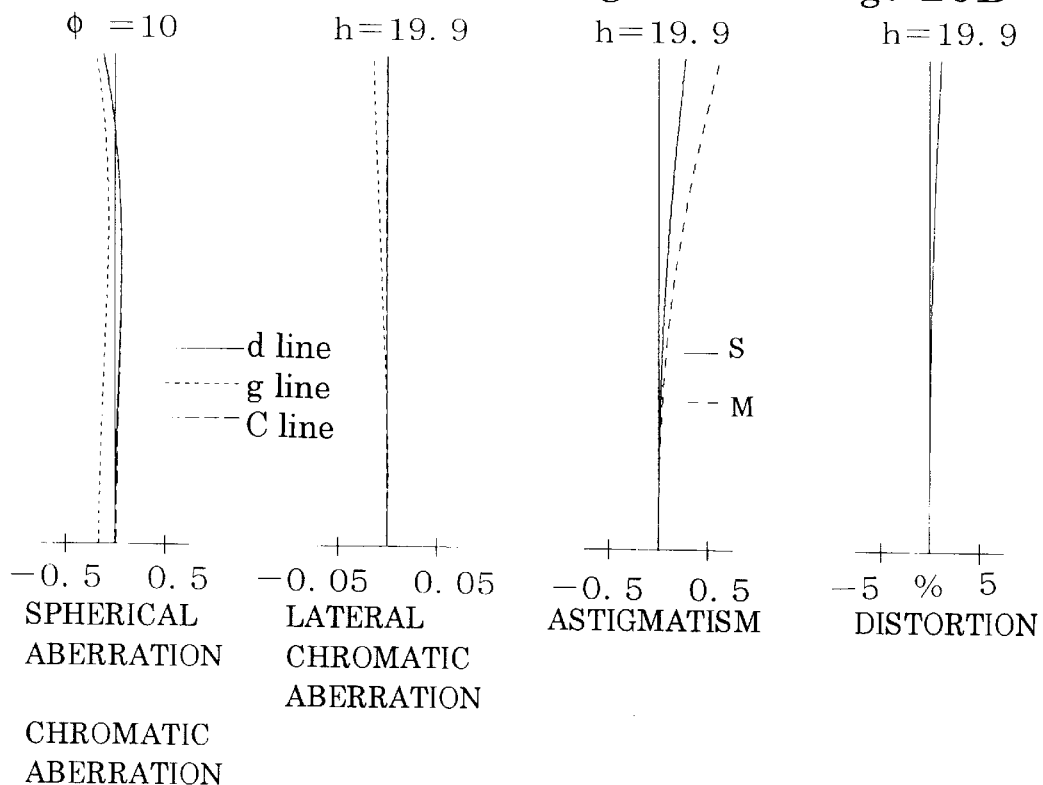

Fig. 21
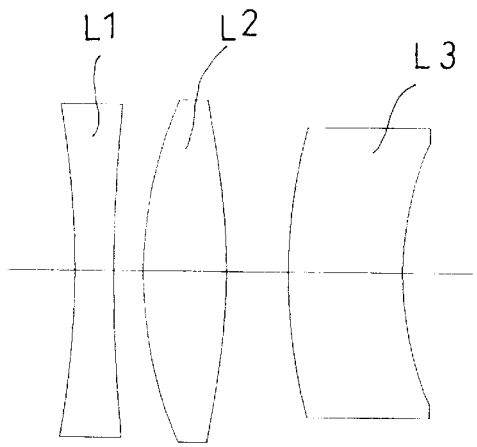
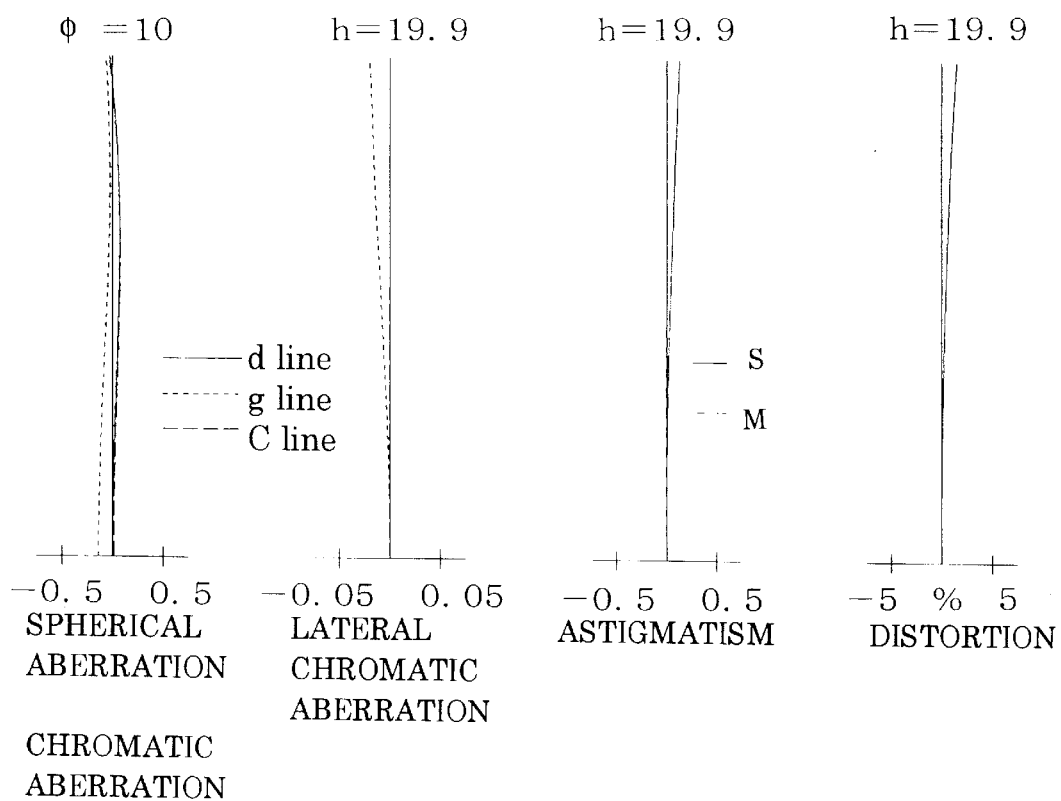
Fig. 22A  Fig. 22B  Fig. 22C  Fig. 22D

Fig. 23A  Fig. 23B  Fig. 23C  Fig. 23D
φ=10     h=19.9    h=19.9    h=19.9
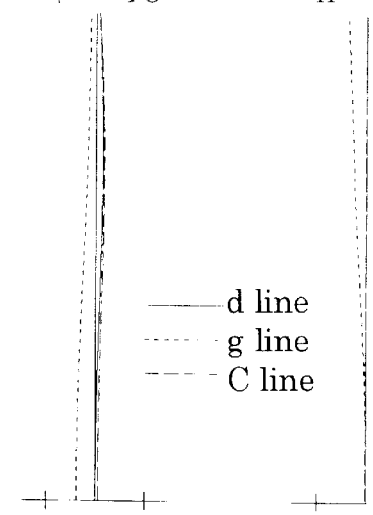
—— d line
······ g line
--- C line
—— S
-- M
-0.5  0.5      -0.05  0.05    -0.5  0.5     -5  %  5
SPHERICAL      LATERAL         ASTIGMATISM    DISTORTION
ABERRATION     CHROMATIC
               ABERRATION
CHROMATIC
ABERRATION
Fig. 24A  Fig. 24B  Fig. 24C  Fig. 24D
φ=10     h=19.9    h=19.9    h=19.9
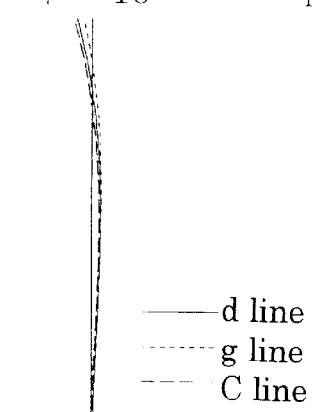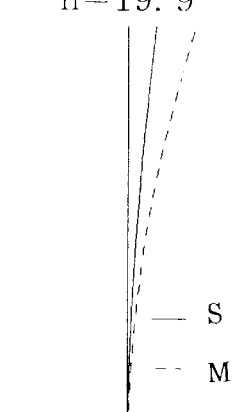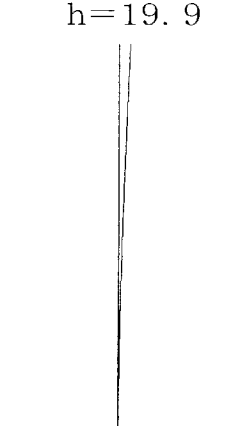
—— d line
······ g line
--- C line
—— S
-- M
-0.5  0.5      -0.05  0.05    -0.5  0.5     -5  %  5
SPHERICAL      LATERAL         ASTIGMATISM    DISTORTION
ABERRATION     CHROMATIC
               ABERRATION
CHROMATIC
ABERRATION

EYEPIECE OPTICAL SYSTEM FOR A SINGLE LENS REFLEX CAMERA

BACKGROUND OF THE INVENTION

1. Field of the Invention

The present invention relates to an eyepiece optical system for a single lens reflex camera.

2. Description of the Related Art

In a single lens reflex camera, an erecting optical system using a hollow penta mirror instead of a penta prism is well known. Since a penta mirror has the reflection-optical-path in the air, the equivalent air thickness along the optical axis cannot be made shorter up to 1/n times (n: the refractive index of a penta prism to be compared) of the equivalent air thickness of the penta prism. Conversely, since the reflection-optical-path is 'n' times as long as that of the penta prism having the same geometrical distance of the reflection-optical-path, the focal length of an eyepiece optical system is made longer, and a finder magnification is lowered. Accordingly, a special design is required for the eyepiece optical system. For example, Japanese Unexamined Patent Publication Nos. 9-146019, and United States Patent Publication No.5,136,427 propose a two-lens-element eyepiece optical system constituted by a positive lens element and a negative lens element, in this order from the side of a penta mirror.

However, the eyepiece optical system in Japanese Unexamined Patent Publication No. 9-146019 is for a single lens reflex camera which uses a film type smaller than a 135-type film, more concretely, for an APS (advanced photo system) camera. Therefore the eyepiece optical system cannot be converted to an eyepiece optical system for a single lens reflex camera in which the a 135-type film is used. Furthermore, the eyepiece optical systems in U.S. Pat. No. U.S. Pat. No. 5,136,427 is not provided with an optical system having a diopter adjusting function. Of course it is theoretically possible to change the diopter by moving at least a portion of lens elements constituting an eyepiece optical system. However, since an optical system having a diopter adjusting function is not originally considered, if an attempt is made to satisfy a condition for maintaining a sufficient eye relief (the distance from the final surface, at the side of a photographer's eye, of the eyepiece optical system to the eyepoint) with respect to the light rays from the periphery of the field-of-view, a range of adjustment is smaller even if the lens diameter is increased, whereby an effect on a diopter adjustment is insufficient.

Furthermore, U.S. Pat. No. 5,313,327 proposes an eyepiece optical system for a penta mirror, the eyepiece optical system of which includes a positive single lens element. Also, this eyepiece optical system can theoretically change the diopter by moving the positive single lens element. However, since the amount of change in the diopter is small with respect to the amount of movement of the positive single lens element, a sufficient range of diopter adjustment cannot be obtained, and even in such a range, a sufficient eye relief with respect to the light rays from the periphery of the field-of-view cannot be maintained.

Moreover, in any of the above mentioned eyepiece optical systems, the change in the apparent visual angle upon the adjustment of the diopter has not been considered. The adjusting of the diopter is usually performed while a photographer is looking through the finder, and accordingly, is unpleasant for the photographer to observe the apparent visual angle being varied. In particular, when the diopter is suitably set for the photographer, if the apparent visual angle is narrowed, the feel of unpleasantness may be intensified.

SUMMARY OF THE INVENTION

It is an object of the present invention to provide an eyepiece optical system for a single lens reflex camera in which a 135-type film is used, and a penta mirror is provided as an erecting optical system; through which a diopter adjustment can be performed. Moreover, even when the diopter adjustment is being performed, change in the apparent visual angle is small. Furthermore, it is another object to provide a smaller sized eyepiece optical system in which a penta mirror is employed, and a sufficient eye relief with respect to the light rays from the periphery of the field-of-view can be maintained.

In order to achieve the above mentioned objects, there is provided an eyepiece optical system for a single lens reflex camera, which utilizes a penta mirror. The eyepiece optical system includes a negative first single lens element, a positive second single lens element, and a negative third single lens element, in this order from the penta mirror; wherein the second single lens element is a diopter adjustment lens element which is adjustable along the optical axis direction; and the following conditions are satisfied:

$$-2 < f_1/f_e < 0 \tag{1}$$

$$0.2 < f_2/f_e < 0.5 \tag{2}$$

$$-10 < f_3/f_e < -1 \tag{3}$$

wherein $f_1$ designates the focal length of the first single lens elements;

$f_2$ designates the focal length of the second single lens element;

$f_3$ designates the focal length of the third single lens element; and $f_e$ designates the focal length of the entire eyepiece optical system when the diopter is −1.0.

The eyepiece optical system preferably satisfies the following condition:

$$0.02 < d_3/(n_3 \times f_e) < 0.07 \tag{4}$$

wherein $d_3$ designates the thickness of the third single lens element; and $n_3$ designates the refractive index of the third single lens element with respect to the d-line.

The eyepiece optical system preferably satisfies the following condition:

$$-1.0 < SF1 < 0 \tag{5}$$

wherein

SF1 designates a value defined by $(r_{1s}+r_{1e})/(r_{1s}-r_{1e})$;

$r_{1s}$ designates the radius of curvature of the penta-mirror-side surface of the first single lens element; and $r_{1e}$ designates the radius of curvature of the photographer's-eye-side surface of the first single lens element.

The third single lens element preferably includes a negative meniscus lens element having a convex surface on the penta mirror side. More concretely, the third single lens element preferably satisfies the following condition:

$$3 < SF3 < 12 \tag{6}$$

wherein

SF3 designates a value defined by $(r_{3s}+r_{3e})/(r_{3s}-r_{3e})$;

$r_{3s}$ designates the radius of curvature of the penta-mirror-side surface of the third single lens element; and $r_{3e}$ designates the radius of curvature of the photographer's-eye-side surface of the third single lens element.

The eyepiece optical system preferably satisfies the following condition:

$$0.5<D_b/D_a<0.9 \qquad (7)$$

wherein $D_a$ designates the distance from the penta-mirror-side surface of the first single lens element to the photographer's-eye-side surface of the third single lens element; and $D_b$ designates the distance from the penta-mirror-side surface of the second single lens element to the photographer's-eye-side surface of the third single lens element which the diopter is −1.0.

The present disclosure relates to subject matters contained in Japanese Patent Application No. 10-278541 (filed on Sep. 30, 1998) and No. 11-158222 (filed on Jun. 4, 1999) which are expressly incorporated herein by reference in their entirety.

BRIEF DESCRIPTION OF THE DRAWINGS

The invention will be discussed below in detail with reference to the accompanying drawings, in which:

FIG. 1 is a lens arrangement the first embodiment of an eyepiece optical system for a single lens reflex camera, according to the present invention;

FIGS. 2A, 2B, 2C and 2D are aberration diagrams of the eyepiece optical system shown in FIG. 1 when the diopter is −1.0;

FIGS. 3A, 3B, 3C and 3D are aberration diagrams of the eyepiece optical system shown in FIG. 1 when the diopter is −2.0;

FIGS. 4A, 4B, 4C and 4D are aberration diagrams of the eyepiece optical system shown in FIG. 1 when the diopter is +1.0;

FIGS. 7A, 7B, 7C and 7D are aberration diagrams of the eyepiece optical system shown in FIG. 5 when the diopter is −2.0;

FIGS. 8A, 8B, 8C and 8D are aberration diagrams of the eyepiece optical system shown in FIG. 5 when the diopter is +1.0;

FIG. 9 is a lens arrangement of the third embodiment of an eyepiece optical system for a single lens reflex camera, according to the present invention;

FIGS. 10A, 10B, 10C and 10D are aberration diagrams of the eyepiece optical system shown in FIG. 9 when the diopter is −1.0;

FIGS. 11A, 11B, 11C and 11D are aberration diagrams of the eyepiece optical system shown in FIG. 9 when the diopter is −2.0;

FIGS. 12A, 12B, 12C and 12D are aberration diagrams of the eyepiece optical system shown in FIG. 9 when the diopter is +1.0;

FIG. 13 is a lens arrangement of the fourth embodiment of an eyepiece optical system for a single lens reflex camera, according to the present invention;

FIGS. 14A, 14B, 14C and 14D are aberration diagrams of the eyepiece optical system shown in FIG. 13 when the diopter is −1.0;

FIGS. 15A, 15B, 15C and 15D are aberration diagrams of the eyepiece optical system shown in FIG. 13 when the diopter is −2.0;

FIGS. 16A, 16B, 16C and 16D are aberration diagrams of the eyepiece optical system shown in FIG. 13 when the diopter is +1.0;

FIG. 17 is a lens arrangement of the fifth embodiment of an eyepiece optical system for a single lens reflex camera, according to the present invention;

FIGS. 18A, 18B, 18C and 18D are aberration diagrams of the eyepiece optical system shown in FIG. 17 when the diopter is −1.0;

FIGS. 19A, 19B, 19C and 19D are aberration diagrams of the eyepiece optical system shown in FIG. 17 when the diopter is −2.0;

FIGS. 20A, 20B, 20C and 20D are aberration diagrams of the eyepiece optical system shown in FIG. 17 when the diopter is +1.0;

FIG. 21 is a lens arrangement of the sixth embodiment of an eyepiece optical system for a single lens reflex camera, according to the present invention;

FIGS. 22A, 22B, 22C and 22D are aberration diagrams of the eyepiece optical system shown in FIG. 21 when the diopter is −1.0;

FIGS. 23A, 23B, 23C and 23D are aberration diagrams of the eyepiece optical system shown in FIG. 21 when the diopter is −2.0;

FIGS. 24A, 24B, 24C and 24D are aberration diagrams of the eyepiece optical system shown in FIG. 21 when the diopter is +1.0;

DESCRIPTION OF THE PREFERRED EMBODIMENTS

Figure 25:
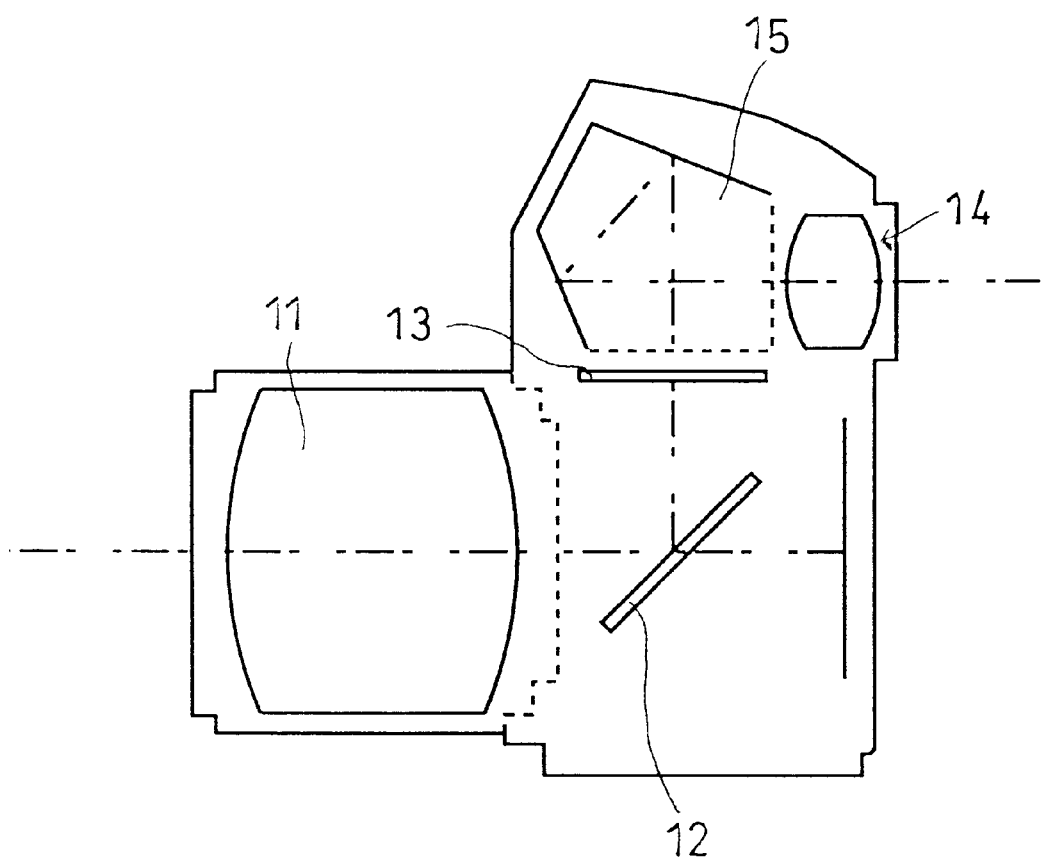
FIG. 25 is a conceptual view of a single lens reflex camera to which the present invention is applied.

FIG. 25 is a conceptual view of a single lens reflex camera which has a penta mirror 15 as an erecting optical system. According to the drawing, an object image formed by a photographic lens system 11 is reflected by the quick-return mirror 12, and is formed as a real image on a focusing plate 13. The photographer views the magnified real image through the eyepiece optical system 14 and the penta mirror 15.

Figure 26:
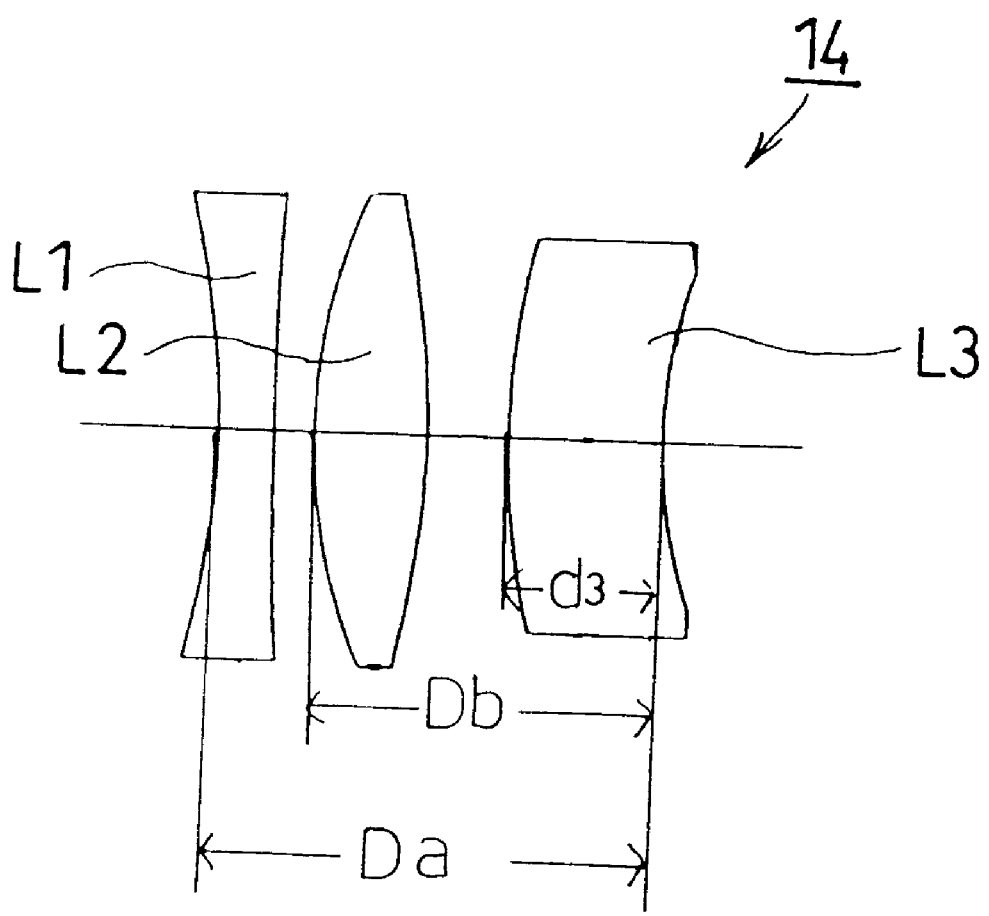
FIG. 26 is a lens arrangement of the eyepiece optical system of the present invention.

The embodiments relate to the structure of the eyepiece optical system 14. As shown in FIG. 26, the eyepiece optical system includes a negative first single lens element L1, a positive second single lens element L2, and a third single lens element L3 which is constituted by a negative meniscus lens element having a convex surface on the penta-mirror-side, in this order from the penta mirror 15. Furthermore, the second single lens element L2 is provided as a diopter adjusting lens element, which is adjustable along the optical axis direction. By moving the second single lens element L2 towards the first single lens element L1, the diopter can be adjusted in the negative direction. On the other hand, the diopter can be adjusted in the positive direction by moving the second single lens element L2 towards the third single lens element L3. The advantages of such an arrangement are described hereinafter.

The penta mirror (pentagonal roof mirror) 15, known in the art, is a mirror having roof-shaped reflection mirror surfaces which replace the reflection surfaces of a penta prism. The inner surfaces of the roof-shaped reflection mirror surfaces are treated with a reflective coating in order to form each reflection surface thereof. Since a plate which is treated with a reflective coating is further provided on the outer side of the reflection surfaces, the contour of the penta mirror 15 is made larger. Furthermore, in the case where the penta mirror 15 is used as an erecting optical system, since the reflection-optical-path is in the air, the equivalent air thickness along the optical axis cannot be made shorter up to 1/n times of the equivalent air thickness of the penta prism (n: the refractive index of a penta prism to be compared). Conversely, the reflection-optical-path is made longer, so that the focal length of an eyepiece optical system is made longer, and a finder magnification is lowered.

In order to miniaturize the camera, or in order to increase the magnification of the finder, the penta mirror 15 has to be miniaturized. However, if the penta mirror 15 is miniaturized, the 'window' through which light rays are emitted from the penta mirror 15 towards the eyepiece optical system is decreased in size, whereby it becomes difficult to maintain a sufficient eye relief with respect to the light rays from the periphery of the field-of-view. In particular, in a finder for a camera in which the 135-type film being most popularized is used, if a penta mirror and a diopter adjusting function are provided, it is learnt that a conventional lens arrangement cannot maintain a sufficient eye relief over the entire area of a sufficient diopter adjustment range.

On the other hand, according to the embodiments, by providing the negative first single lens element L1 which has diverging power and is positioned at the most penta-mirror-side of the eyepiece optical system, light rays emitted from the narrow window of the penta mirror 15 is made higher (away from the optical axis), whereby it is easier to maintain a sufficient eye relief with respect to the light rays from the periphery of the field-of-view.

Finder optical systems for single lens reflex cameras, including those of the embodiments, generally have positive power as a whole. In the embodiments, the first single lens element L1 has relatively strong negative power, and light rays from the periphery of the field-of-view are made approximately parallel to the optical axis and are then made incident on the positive second single lens element L2 which is the diopter adjusting lens element. Due to this arrangement, even if the position of the second single lens element L2 is varied, the change in height of light rays incident on the second single lens element L2 is substantially eliminated, so that light rays can be emitted from the second single lens element L2 at a constant emission angle regardless of the position of the second single lens element L2. Since the power of the subsequent third single lens element L3 is weaker, more concretely, the power thereof is not so strong as to change the angle of light rays from the second single lens element L2 in accordance with the position of the second single lens element L2 (depending on the diopter) although the third single lens element L3 can slightly bend light rays outward, through which a sufficient eye relief with respect to light rays from the periphery of the field-of-view can be maintained. Due to the above power distribution, the change in the apparent visual angle upon a diopter adjustment can be reduced.

It is also theoretically possible to design the first single lens element L1 or the third single lens element L3 as a diopter adjustment lens element which is movable in the optical axis direction. However, preferably, the first single lens element L1 is fixedly positioned immediately behind the penta mirror 15 in order to increase the height of light rays. Likewise, preferably, the third single lens element L3 is fixedly positioned since the third single lens element L3 is the final lens element which would possibly be touched by the hand of a photographer unless a separate cover-glass is provided. Accordingly, in the embodiments, the second single lens element L2 is used as the diopter adjusting lens element.

In order to increase the magnification of the finder, the focal length of the entire eyepiece optical system is made shorter as much as possible. In other words, the principal points of the entire eyepiece optical system are positioned as close to the penta mirror 15 as possible. By forming the third single lens element L3 as a negative meniscus lens element having a convex surface on the side of the penta mirror 15, the principal points can be positioned on the side of the penta mirror 15.

Condition (1) specifies the power of the negative first single lens element L1. If $f_1/f_e$ exceeds the upper limit of condition (1), the negative power of the first single lens element L1 becomes too strong, and light rays are diverged too much, so that the diameters of the subsequent lens elements have to be increased. If $f_1/f_e$ exceeds the lower limit of condition (1), the negative power of the first single lens element L1 becomes too weak, so that an eye relief is not sufficiently maintained, and the negative power of the third single lens element L3 which is given negative power has to be increased. Accordingly, condition (3) is not satisfied.

Condition (2) specifies the power of the positive second single lens element L2 which is the diopter adjusting lens element. If the positive power of the second single lens element L2 becomes strong to the extent that $f_2/f_e$ exceeds the lower limit of condition (2), the diopter can be adjusted by a small amount of movement thereof; however, deterioration in aberrations due to decentration and unstableness of the image when the positive second single lens element L2 is being moved become apparent. If $f_2/f_e$ exceeds the upper limit of condition (2), the power of the second single lens element L2 becomes too weak. As a result, even when the second single lens element L2 is moved along the optical axis, the change in diopter is small, and the diopter adjustment range is made narrower.

Condition (3) specifies the power of the negative third single lens element L3. If $f_3/f_e$ exceeds the upper limit of condition (3), the power of the third single lens element L3 becomes too strong, so that the change in the apparent visual angle upon diopter adjustment is increased. If $f_3/f_e$ exceeds the lower limit of condition (3), a sufficient eye relief cannot be maintained.

Condition (4) specifies the thickness of the third single lens element L3, whereby a sufficient eye relief is maintained while the eyepiece optical system can be miniaturized. If $d_3/(n_3 \times f_e)$ exceeds the upper limit of condition (4), it is advantageous to maintain a long eye relief; however, the size of the finder increases. If $d_3/(n_3/f_e)$ exceeds the lower limit of condition (4), the final lens surface of the eyepiece optical system (the photographer's-eye-side surface of the third single lens element L3) becomes caved-in with respect to the rear surface of the camera body, and a sufficient eye relief cannot be maintained.

Condition (5) specifies the shape of the first single lens element L1. If SF1 exceeds the lower limit of condition (5), the first single lens element L1 can still maintain the shape of a meniscus lens element; however, if the first single lens element L1 is made to have power which satisfies condition (1), the radius of curvature $r_{1s}$ and $r_{1e}$ of the front and rear lens surfaces the first single lens element L1 become smaller. Accordingly, if the peripheral portions of the first single lens element L1 (on the penta-mirror side surface) and the emission surface of the penta mirror 15 are positioned not to interfere with each other, the first surface of the first single lens element L1 has to be positioned away from the penta mirror 15. As a result, the size of the eyepiece optical system increases. If SF1 exceeds the upper limit of condition (5), the radius of curvature of the photographer's-eye-side surface of the first single lens element L1 becomes smaller, and the edge portion of the first single lens element L1 approaches the second single lens element L2, whereby the amount of movement of the second single lens element L2 is restricted; as a result, a sufficient diopter adjustment cannot be performed.

Condition (6) specifies the shape of the negative third single lens element L3. This condition specifies that the third single lens element L3 is a most suitable negative meniscus lens element. If SF3 exceeds the lower limit of condition (6), the radii of curvatures of the front and rear surfaces of the third single lens element L3 increase. If the third single lens element L3 is made to have power which satisfies condition (3), the distance between the peripheral portions of the second and third single lens elements L2 and L3 has to be decreased. However, by considering the structure of the frame for containing the lens elements, it is difficult for the second and third single lenses L2 and L3 to approach each other closely. As a result, a sufficient range for diopter adjustment cannot be secured. If SF3 exceeds the upper limit of condition (6), the radii of curvatures of the front and rear surfaces of the third single lens element L3 have to be decreased in order to provide a power which satisfies condition (3). As a result, a sufficient eye relief cannot be maintained.

Condition (7) specifies the ratio of the length of the entire eyepiece optical system to the distance from the penta-mirror-side surface of the second single lens element L2 to the photographer's-eye-side surface of the third single lens element L3.

If $D_b/D_a$ exceeds the lower limit of condition (7), incident positions of the light rays on the second single lens element L2 become too high, so that either the lens diameter increases, or the finder magnification is lowered. If $D_b/D_a$ exceeds the upper limit of condition (7), the first and second single lens elements L1 and L2 approach each other closely, and the movement of the second single lens element L2 towards the penta mirror 12 is restricted. As a result, a sufficient diopter adjustment cannot be performed.

Specific numerical examples will be herein discussed. In the tables and diagrams, DP designates the diopter; $f_e$ designates the focal length of the eyepiece optical system; β designates the (half amount) apparent visual angle; θ designates the diameter of the exit pupil; h designates the farthest distance from a supposed optical axis on the focusing plate when the finder coverage of the frame size for the 135-type film is 92% ((21.6 (half amount)×0.92=19.9 mm); d0 designates the distance from the image forming plane (focusing plate) of the photographing optical system to the penta-prism-side surface of the first lens element of the eyepiece optical system; and ER designates the eye relief (the distance from the final surface, at the side of a photographer's eye, of the eyepiece optical system to the eyepoint (the position of the exit pupil of the finder optical system)). In the diagrams of chromatic aberration represented by spherical aberrations, the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. Furthermore, R designates the radius of curvature, D designates the lens thickness or space between lens elements, Nd designates the refractive index of the d-line, and vd designates the Abbe number.

In addition to the above, an aspherical surface which is symmetrical with respect to the optical axis is defined as follows:

$$x=Ch^2/\{1+[1-(1+K)C^2h^2]^{1/2}\}+A4h^4+A6h^6+A8h^8+A10h^{10};$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient;

Embodiment 1

FIG. 1 is a lens arrangement the first embodiment of an eyepiece-optical system for a single lens reflex camera, and Table 1 show the numerical date thereof. FIGS. 2A, 2B, 2C and 2D are aberration diagrams of the eyepiece optical system shown in FIG. 1 when the diopter is −1.0. FIGS. 3A, 3B, 3C and 3D are aberration diagrams of the eyepiece optical system shown in FIG. 1 when the diopter is −2.0. FIGS. 4A, 4B, 4C and 4D are aberration diagrams of the eyepiece optical system shown in FIG. 1 when the diopter is +1.0. The lens arrangement in the first embodiment is the same as the one shown in FIG. 26.

TABLE 1

DP = −1.0~−2.0~+1.0 (diopter)
fe = 82.00~85.52~75.53
β = 14.9~14.6~14.1 (degree)
d0 = 77.72
ER = 15.23

| No. | R | D | Nd | vd |
|---|---|---|---|---|
| 1* | −28.540 | 2.000 | 1.58547 | 29.9 |
| 2* | 241.887 | 1.479~0.676~3.215 | — | — |
| 3 | 20.740 | 4.021 | 1.49176 | 57.4 |
| 4* | −28.888 | 2.926~3.729~1.190 | — | — |
| 5 | 28.394 | 5.500 | 1.58547 | 29.9 |
| 6* | 17.613 | — | — | — |

*designates the aspherical surface which is rotationally symmetrical with respect to the optical axis.

Aspherical surface data (the aspherical surface coefficients not indicated are zero (0.00)):

| | | | |
|---|---|---|---|
| No. 1 | K = 0.0 | A4 = 0.2228 × 10$^{-4}$ | A6 = 0.6083 × 10$^{-7}$ |
| No. 2 | K = 0.0 | A4 = 0.2090 × 10$^{-4}$ | A6 = 0.0 |
| No. 4 | K = 0.0 | A4 = 0.3980 × 10$^{-4}$ | A6 = −0.9939 × 10$^{-8}$ |
| No. 6 | K = 0.0 | A4 = −0.8289 × 10$^{-5}$ | A6 = 0.1429 × 10$^{-6}$ |

Embodiment 2

Figure 5:
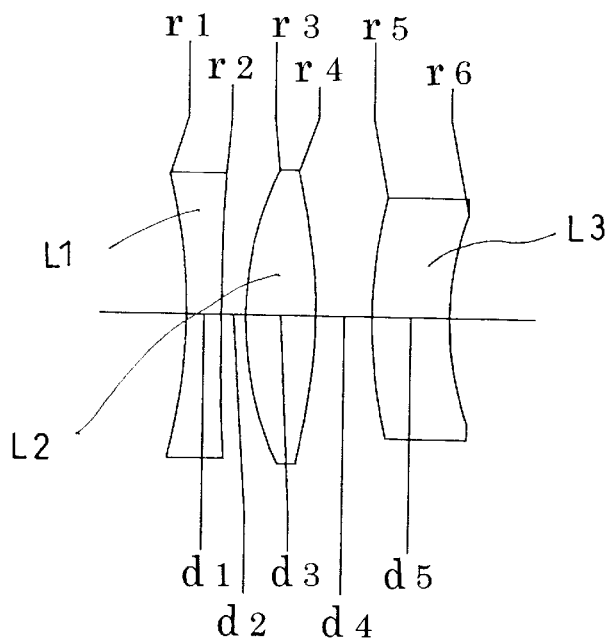
FIG. 5 is a lens arrangement of the second embodiment of an eyepiece optical system for a single lens reflex camera, according to the present invention.
Figure 6A:
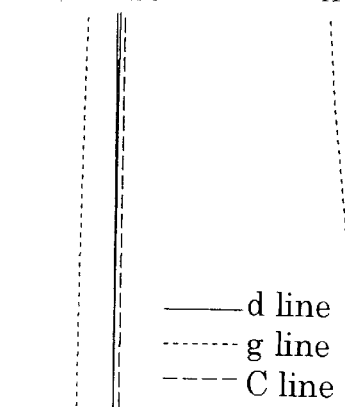
FIGS. 6A, 6B, 6C and 6D are aberration diagrams of the eyepiece optical system shown in FIG. 5 when the diopter is −1.0.
Figure 6B:
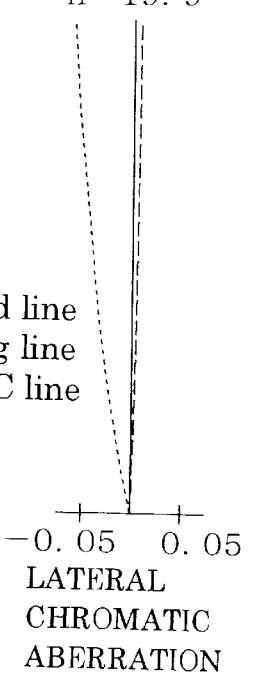
Figure 6C:
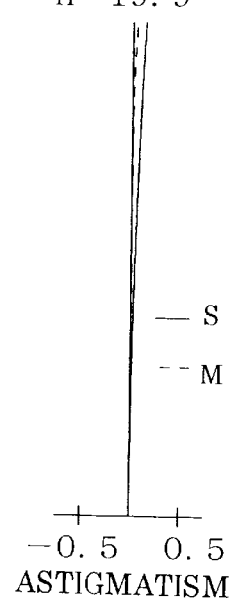
Figure 6D:
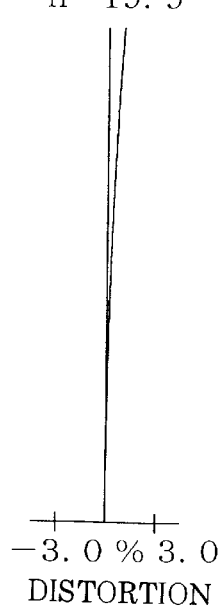

FIG. 5 is a lens arrangement of the second embodiment of an eyepiece optical system for a single lens reflex camera, and Table 2 shows the numerical data thereof. FIGS. 6A, 6B, 6C and 6D are aberration diagrams of the eyepiece optical system shown in FIG. 5 when the diopter is −1.0. FIGS. 7A, 7B, 7C and 7D are aberration diagrams of the eyepiece optical system shown in FIG. 5 when the diopter is −2.0. FIGS. 8A, 8B, 8C and 8D are aberration diagrams of the eyepiece optical system shown in FIG. 5 when the diopter is +1.0. The lens arrangement in the second embodiment is the same as the one shown in FIG. 26.

TABLE 2

DP = −1.0~−2.0~+1.0 (diopter)
fe = 82.00~85.12~76.21
β = 15.0~14.7~14.0 (degree)
d0 = 77.68
ER = 15.23

| No. | R | D | Nd | νd |
|---|---|---|---|---|
| 1* | −29.767 | 2.000 | 1.58547 | 29.9 |
| 2* | 293.051 | 1.401~0.508~3.370 | — | — |
| 3 | 20.337 | 4.056 | 1.49176 | 57.4 |
| 4* | −28.722 | 3.265~4.158~1.296 | — | — |
| 5* | 29.331 | 4.500 | 1.58547 | 29.9 |
| 6* | 17.345 | — | — | — |

*designates the aspherical surface which is rotationally symmetrical with respect to the optical axis.

Aspherical surface data (the aspherical surface 5 coefficients not indicated are zero (0.00)):

| No. 1 | K = 0.0 | A4 = 0.1941 × 10$^{-4}$ | A6 = 0.6138 × 10$^{-7}$ |
| No. 2 | K = 0.0 | A4 = 0.1926 × 10$^{-4}$ | A6 = 0.0 |
| No. 4 | K = 0.0 | A4 = 0.4206 × 10$^{-4}$ | A6 = −0.1605 × 10$^{-7}$ |
| No. 5 | K = 0.0 | A4 = −0.2541 × 10$^{-5}$ | A6 = 0.0 |
| No. 6 | K = 0.0 | A4 = −0.1444 × 10$^{-4}$ | A6 = 0.1427 × 10$^{-6}$ |

Embodiment 3

FIG. 9 is a lens arrangement of the third embodiment of an eyepiece optical system for a single lens reflex camera, and Table 3 shows the numerical data thereof. FIGS. 10A, 10B, 10C and 10D are aberration diagrams of the eyepiece optical system shown in FIG. 9 when the diopter is −1.0. FIGS. 11A, 11B, 11C and 11D are aberration diagrams of the eyepiece optical system shown in FIG. 9 when the diopter is −2.0. FIGS. 12A, 12B, 12C and 12D are aberration diagrams of the eyepiece optical system shown in FIG. 9 when the diopter is +1.0. The lens arrangement in the third embodiment is the same as the one shown in FIG. 26.

TABLE 3

DP = −1.0~−2.0~+1.0 (diopter)
fe = 82.00~86.17~74.66
β = 14.5~14.6~14.3 (degree)
d0 = 77.66
ER = 15.23

| No. | R | D | Nd | νd |
|---|---|---|---|---|
| 1* | −32.388 | 2.000 | 1.58547 | 29.9 |
| 2 | 154.254 | 1.320~0.500~3.001 | — | — |
| 3 | 28.700 | 3.348 | 1.49176 | 57.4 |
| 4* | −29.530 | 2.791~3.611~1.110 | — | — |

TABLE 3-continued

DP = −1.0~−2.0~+1.0 (diopter)
fe = 82.00~86.17~74.66
β = 14.5~14.6~14.3 (degree)
d0 = 77.66
ER = 15.23

| No. | R | D | Nd | νd |
|---|---|---|---|---|
| 5 | 18.611 | 5.500 | 1.58547 | 29.9 |
| 6* | 15.000 | — | — | — |

*designates the aspherical surface which is rotationally symmetrical with respect to the optical axis.

Aspherical surface data (the aspherical surface coefficients not indicated are zero (0.00)):

| No. 1 | K = 0.0 | A4 = 0.7501 × 10$^{-5}$ | A6 = 0.0 |
| No. 4 | K = 0.0 | A4 = 0.3089 × 10$^{-4}$ | A6 = −0.4601 × 10$^{-7}$ |
| No. 6 | K = 0.0 | A4 = −0.1169 × 10$^{-4}$ | A6 = 0.1414 × 10$^{-6}$ |

Embodiment 4

FIG. 13 is a lens arrangement of the fourth embodiment of an eyepiece optical system for a single lens reflex camera, and Table 4 shows the numerical data thereof. FIGS. 14A, 14B, 14C and 14D are aberration diagrams of the eyepiece optical system shown in FIG. 13 when the diopter is −1.0. FIGS. 15A, 15B, 15C and 15D are aberration diagrams of the eyepiece optical system shown in FIG. 13 when the diopter is −2.0. FIGS. 16A, 16B, 16C and 16D are aberration diagrams of the eyepiece optical system shown in FIG. 13 when the diopter is +1.0. The lens arrangement in the fourth embodiment is the same as the one shown in FIG. 26.

TABLE 4

DP = −1.0~−2.0~+1.0 (diopter)
fe = 82.13~86.26~74.85
β = 14.5~14.6~14.3 (degree)
d0 = 77.86
ER = 15.23

| No. | R | D | Nd | νd |
|---|---|---|---|---|
| 1* | −35.901 | 2.000 | 1.58547 | 29.9 |
| 2 | 131.050 | 1.343~0.470~3.131 | — | — |
| 3 | 28.700 | 3.560 | 1.49176 | 57.4 |
| 4* | −32.211 | 2.516~3.389~0.728 | — | — |
| 5 | 18.330 | 5.500 | 1.58547 | 29.9 |
| 6* | 15.000 | — | — | — |

*designates the aspherical surface which is rotationally symmetrical with respect to the optical axis.

Aspherical surface data (the aspherical surface coefficients not indicated are zero (0.00)):

| No. 1 | K = 0.0 | A4 = 0.6200 × 10$^{-5}$ | A6 = 0.0 |
| No. 4 | K = 0.0 | A4 = 0.2600 × 10$^{-4}$ | A6 = −0.3400 × 10$^{-7}$ |
| No. 6 | K = 0.0 | A4 = −0.5700 × 10$^{-5}$ | A6 = 0.7700 × 10$^{-7}$ |

Embodiment 5

FIG. 17 is a lens arrangement of the fifth embodiment of an eyepiece optical system for a single lens reflex camera, and Table 5 shows the numerical data thereof. FIGS. 18A,

18B, 18C and 18D are aberration diagrams of the eyepiece optical system shown in FIG. 17 when the diopter is −1.0. FIGS. 19A, 19B, 19C and 19D are aberration diagrams of the eyepiece optical system shown in FIG. 17 when the diopter is −2.0. FIGS. 20A, 20B, 20C and 20D are aberration diagrams of the eyepiece optical system shown in FIG. 17 when the diopter is +1.0. The lens arrangement in the fifth embodiment is the same as the one shown in FIG. 26.

TABLE 5

DP = −1.0~−2.0~+1.0 (diopter)
fe = 79.20~82.17~73.73
β = 15.0~15.2~14.6 (degree)
d0 = 77.86
ER = 15.23

| No. | R | D | Nd | νd |
|---|---|---|---|---|
| 1* | −41.501 | 1.800 | 1.58547 | 29.9 |
| 2 | 96.200 | 1.389~0.500~3.291 | — | — |
| 3 | 21.950 | 3.850 | 1.49176 | 57.4 |
| 4* | −31.137 | 3.035~3.924~1.133 | — | — |
| 5 | 22.490 | 5.300 | 1.58547 | 29.9 |
| 6* | 15.000 | — | — | — |

*designates the aspherical surface which is rotationally symmetrical with respect to the optical axis.

Aspherical surface data (the aspherical surface coefficients not indicated are zero (0.00)):

| No. 1 | K = 0.0 | A4 = 0.4860 × $10^{-5}$ | A6 = 0.3230 × $10^{-7}$ |
| No. 4 | K = 0.0 | A4 = 0.4550 × $10^{-4}$ | A6 = −0.5200 × $10^{-7}$ |
| No. 6 | K = 0.0 | A4 = −0.2870 × $10^{-4}$ | A6 = 0.2370 × $10^{-6}$ |

Embodiment 6

FIG. 21 is a lens arrangement of the sixth embodiment of an eyepiece optical system for a single lens reflex camera, and Table 6 shows the numerical data thereof. FIGS. 22A, 22B, 22C and 22D are aberration diagrams of the eyepiece optical system shown in FIG. 21 when the diopter is −1.0. FIGS. 23A, 23B, 23C and 23D are aberration diagrams of the eyepiece optical system shown in FIG. 21 when the diopter is −2.0. FIGS. 24A, 24B, 24C and 24D are aberration diagrams of the eyepiece optical system shown in FIG. 21 when the diopter is +1.0. The lens arrangement in the sixth embodiment is the same as the one shown in FIG. 26.

TABLE 6

DP = −1.0~−2.0~+1.0 (diopter)
fe = 79.20~82.00~74.03
β = 15.0~15.2~14.6 (degree)
d0 = 77.86
ER = 15.23

| No. | R | D | Nd | νd |
|---|---|---|---|---|
| 1* | −42.274 | 1.800 | 1.58547 | 29.9 |
| 2 | 79.392 | 1.362~0.500~3.238 | — | — |
| 3 | 19.975 | 3.850 | 1.49176 | 57.4 |
| 4* | −29.243 | 2.853~3.715~0.977 | — | — |
| 5 | 25.740 | 5.300 | 1.52538 | 56.3 |
| 6* | 15.000 | — | — | — |

*designates the aspherical surface which is rotationally symmetrical with respect to the optical axis.

Aspherical surface data (the aspherical surface coefficients not indicated are zero (0.00)):

| No. 1 | K = 0.0 | A4 = 0.3700 × $10^{-5}$ | A6 = 0.5920 × $10^{-7}$ |
| No. 4 | K = 0.0 | A4 = 0.5550 × $10^{-4}$ | A6 = −0.5240 × $10^{-7}$ |
| No. 6 | K = 0.0 | A4 = −0.3800 × $10^{-4}$ | A6 = 0.3410 × $10^{-6}$ |

Table 7 shows the values of each condition for each embodiment.

TABLE 7

|  | Embodiment 1 | Embodiment 2 | Embodiment 3 | Embodiment 4 | Embodiment 5 | Embodiment 6 |
|---|---|---|---|---|---|---|
| Condition (1) | −0.53 | −0.56 | −0.56 | −0.58 | −0.62 | −0.59 |
| Condition (2) | 0.31 | 0.30 | 0.37 | 0.38 | 0.34 | 0.31 |
| Condition (3) | −1.19 | −1.03 | −3.68 | −4.40 | −1.31 | −1.04 |
| Condition (4) | 0.042 | 0.035 | 0.042 | 0.042 | 0.042 | 0.044 |
| Condition (5) | −0.79 | −0.82 | −0.65 | −0.57 | −0.40 | −0.31 |
| Condition (6) | 4.27 | 3.89 | 9.31 | 10.01 | 5.04 | 3.79 |
| Condition (7) | 0.782 | 0.777 | 0.778 | 0.77 | 0.793 | 0.791 |

As clearly shown in Table 7, embodiments 1 through 6 satisfy conditions (1) through (7). Furthermore, as shown in the aberration diagrams, aberrations at each diopter have been adequately corrected.

According to the above description, an eyepiece optical system, for a single lens reflex camera having a penta mirror, can perform a diopter adjustment, can eliminate the change in the apparent visual angle when a diopter adjustment is being performed, and can sufficiently maintain an eye relief. Furthermore, the entire structure of the eyepiece optical system, including the penta mirror, can be made smaller.

What is claimed is:

1. An eyepiece optical system for a single lens reflex camera having a penta mirror, comprising:
    a negative first single lens element, a positive second single lens element, and a negative third single lens element, in this order from said penta mirror;
    wherein said second single lens element is a diopter adjusting lens element which is adjustable along the optical axis; and wherein said eyepiece optical system satisfies the following conditions:

$$-2 < f_1/f_e < 0$$

$$0.2 < f_2/f_e < 0.5$$

$$-10 < f_3/f_e < -1$$

wherein $f_1$ designates the focal length of said first single lens element;

$f_2$ designates the focal length of said second single lens element;

$f_3$ designates the focal length of said third single lens element; and $f_e$ designates the focal length of the entire eyepiece optical system when the diopter is −1.0.

2. The eyepiece optical system for a single lens reflex camera according to claim 1, wherein the following condition is satisfied:

$$0.02 < d_3/(n_3 \times f_e) < 0.07$$

wherein $d_3$ designates the thickness of said third single lens element; and $n_3$ designates the refractive index of said third single lens element with respect to the d-line.

3. The eyepiece optical system for a single lens reflex camera according to claim 1, wherein the following condition is satisfied:

$$-1.0 < SF1 < 0$$

wherein

SF1 designates a value defined by $(r_{1s}+r_{1e})/(r_{1s}-r_{1e})$;

$r_{1s}$ designates the radius of curvature of the penta-mirror-side surface of said first single lens element; and $r_{1e}$ designates the radius of curvature of the photographer's-eye-side surface of said first single lens element.

4. The eyepiece optical system for a single lens reflex camera according to claim 1, wherein said third single lens element comprises a negative meniscus lens element having a convex surface on the side of said penta mirror.

5. The eyepiece optical system for a single lens reflex camera according to claim 4, wherein the following condition is satisfied:

$$3 < SF3 < 12;$$

wherein

SF3 designates a value defined by $(r_{3s}+r_{3e})/(r_{3s}-r_{3e})$;

$r_{3s}$ designates the radius of curvature of the penta-mirror-side surface of said third single lens element; and $r_{3e}$ designates the radius of curvature of the photographer-eye-side surface of said third single lens element.

6. The eyepiece optical system for a single lens reflex camera according to claim 1, wherein the following condition is satisfied:

$$0.5 < D_b/D_a < 0.9;$$

wherein $D_a$ designates the distance from the penta-mirror-side surface of said first single lens element to the photographer's-eye-side surface of said third single lens element; and $D_b$ designates the distance from the penta-mirror-side surface of said second single lens element to the photographer's-eye-side surface of said third single lens element which the diopter is −1.0.

* * * * *